United States Patent
Fillep et al.

(10) Patent No.: US 11,937,549 B2
(45) Date of Patent: Mar. 26, 2024

(54) AGRICULTURAL APPARATUS COMPRISING SPEED SENSORS AND CONTROLS

(71) Applicant: AGCO International GmbH, Neuhausen (CH)

(72) Inventors: Johannes Fillep, Feucht (DE); Ronnie Kinast, Ilschwang (DE)

(73) Assignee: AGCO International GmbH, Neuhausen (CH)

( * ) Notice: Subject to any disclaimer, the term of this patent is extended or adjusted under 35 U.S.C. 154(b) by 397 days.

(21) Appl. No.: 17/199,415

(22) Filed: Mar. 11, 2021

(65) Prior Publication Data

US 2021/0282326 A1    Sep. 16, 2021

(30) Foreign Application Priority Data

Mar. 11, 2020    (GB) .................................... 2003489

(51) Int. Cl.
*A01D 75/28*    (2006.01)
*A01D 34/86*    (2006.01)
*A01D 57/20*    (2006.01)

(52) U.S. Cl.
CPC ............. *A01D 75/28* (2013.01); *A01D 34/86* (2013.01); *A01D 57/20* (2013.01)

(58) Field of Classification Search
CPC ......... A01D 34/06; A01D 57/20; A01D 75/28
See application file for complete search history.

(56) References Cited

U.S. PATENT DOCUMENTS

2016/0309655 A1* 10/2016 Treffer .................. A01D 43/04

FOREIGN PATENT DOCUMENTS

| DE | 29816837 U1 | 1/1999 | |
|----|----|----|----|
| EP | 1616474 A1 | 1/2006 | |
| EP | 2 529 614 A1 | 12/2012 | |
| EP | 2769613 A1 * | 8/2014 | ........... A01D 75/287 |
| EP | 2875715 A1 | 5/2015 | |
| EP | 2769613 B1 | 4/2017 | |
| GB | 2477543 A | 8/2011 | |
| WO | 2019/211229 A1 | 11/2019 | |

OTHER PUBLICATIONS

European Patent Office, Search Report for related European Application No. EP21153627.1, dated Jul. 19, 2021.
UK Intellectual Property Office, Search Report for related UK Application No. GB2003489.8, dated Sep. 3, 2020.

* cited by examiner

*Primary Examiner* — Kevin A Lathers

(57) ABSTRACT

A mower combination including an agricultural vehicle and a number of mowing units suitable for cutting standing crop, including a front mowing unit and two lateral mowing units located behind and to the sides of the front mowing unit. Each of the lateral mowing units includes a conveyor to deposit cut crop as a swath. Sensors determine the slope and lateral displacement of each conveyor. A control unit receives inputs from the sensors and compares the inputs to a predetermined set of values of slope and, as indicated by the comparison, adjusts the lateral displacement of at least one conveyor.

5 Claims, 4 Drawing Sheets

AGRICULTURAL APPARATUS COMPRISING SPEED SENSORS AND CONTROLS

CROSS REFERENCE TO RELATED APPLICATION

This application claims the benefit of the filing date of U.K. Application No. GB2003489.8, "Agricultural Apparatus," filed Mar. 11, 2020, which is hereby incorporated by reference in its entirety.

TECHNICAL FIELD

The present disclosure relates to a mower combination comprising an agricultural vehicle and a number of mowing units suitable for generating swathes of cut crop, and in particular to a mowing apparatus for cutting a standing crop such as hay and operating on a slope.

BACKGROUND

It is known to provide a mower combination in which a first mower unit is located ahead of an agricultural vehicle such as a tractor with two further lateral mower units trailing the agricultural vehicle. The rear mower units are provided with conveyors for depositing cut crop into a swath or swathes behind the agricultural vehicle.

Typically the conveyors are operated at constant speeds. This has as a disadvantage that as the speed of the agricultural vehicle is increased, the harvesting throughput increases leading to a build-up of cut crop on the conveyors with an increasing risk that the build-up may become a blockage. When this happens, mowing must stop while an operator attends to clearing of the blockage. Particularly in a time-sensitive operation such as mowing, such stoppages are highly undesirable.

Further it is desirable when creating a swath of cut crop for the swath to be of uniform width. This aids in processing of the swath by a subsequent vehicle, such as a baler or a loader wagon. An uneven swath can cause inefficient processing of the cut crop by the subsequent vehicle. Problems with blockage and non-uniform swathes can become worse when the mower combination is being operated on a sloping surface.

BRIEF SUMMARY

According to a first embodiment, a mower combination comprises an agricultural vehicle and a number of mowing units suitable for cutting a standing crop connected to the agricultural vehicle, including a front mowing unit and two lateral mowing units located behind and to the sides of the front mowing unit, each of the lateral mowing units being provided with conveyors to deposit the cut crop as a swath, the mower combination further comprising a control unit receiving a plurality of signals. The signals represent an angle of inclination of the mower combination and the lateral displacement of the conveyors. The control unit is configured to receive the plurality of signals and compare the signals for the angle of inclination of the mower combination and the lateral displacement of the conveyors to a predetermined set of values and to adjust the lateral displacement of at least one conveyor based on the comparison.

The lateral displacement of the conveyors can be adjusted to allow for production of a uniform swath regardless of the angle of inclination detected. The conveyors may include conveyor belts or conveyor screws.

The mower combination may also include a user terminal coupled to the control unit to provide feedback to an operator about the lateral displacement of the conveyors.

According to another embodiment, a method of operation of the mower combination comprises receiving real-time input signals representing the angle of inclination of the mower combination and the lateral displacement of the conveyor(s), and adjusting the lateral displacement of the conveyor(s) based on comparison of the input signals with respective target values.

According to another embodiment, a computer implemented method comprises a control unit receiving signals representing the angle of inclination of the mower combination and the lateral displacement of the conveyors, comparing the received signals to a predetermined set of values, and adjusting the lateral displacement of the conveyors when indicated by the comparison.

According to another embodiment, a computer readable storage medium comprises instructions that cause one or more processors to implement the methods described herein.

BRIEF DESCRIPTION OF THE DRAWINGS

Embodiments will now be described, by way of example only, with reference to the accompanying drawings, in which.

DETAILED DESCRIPTION

The disclosure will now be described in the following detailed description with reference to the drawings, wherein certain embodiments are described in detail. Although described with reference to these specific preferred embodiments, it will be understood that the disclosure is not limited to these embodiments. But to the contrary, numerous alternatives, modifications, and equivalents will become apparent from consideration of the following detailed description.

Reference to terms such as longitudinal, lateral, and vertical are made with respect to a longitudinal vehicle axis, which is parallel to a normal forward direction of travel.

Figure 1:
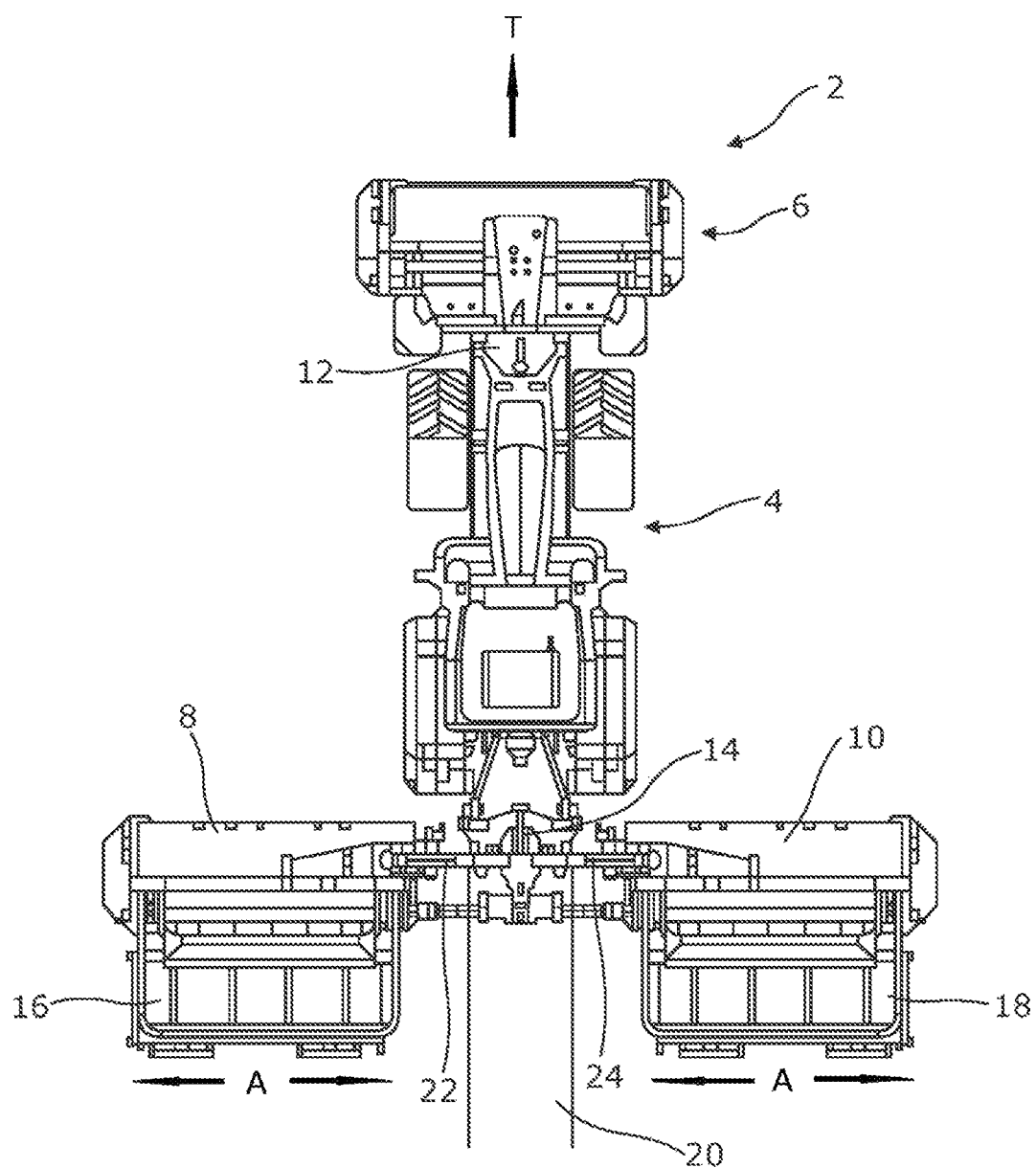
FIG. 1 shows a plan view of a mower combination.
Figure 2:
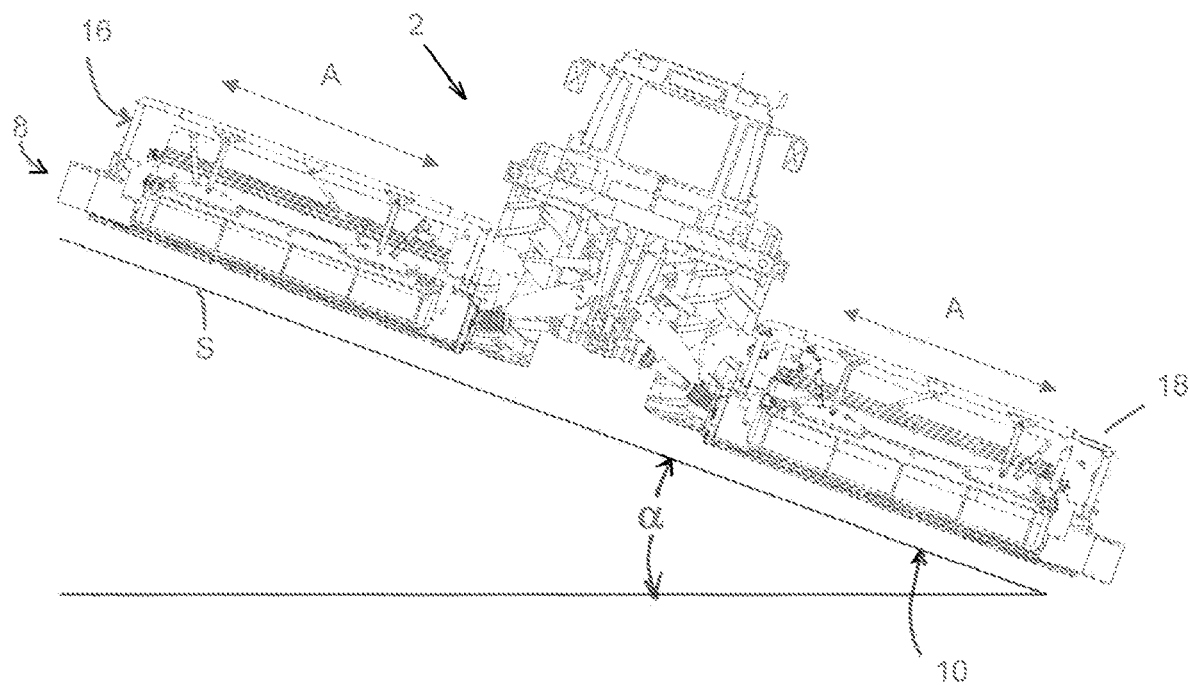
FIG. 2 shows a rear view of the mower combination shown in FIG. 1.
Figure 3:
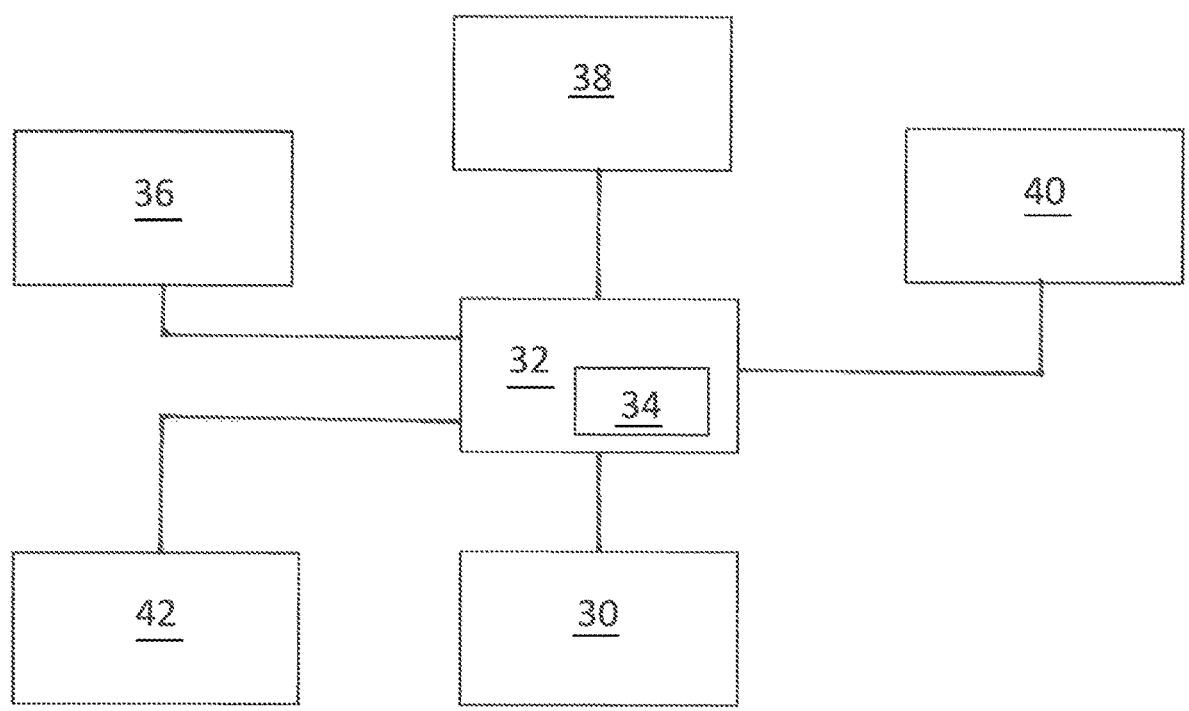
FIG. 3 shows a schematic view of elements of a mower combination.

With reference to FIGS. 1 and 2, views of a mower combination 2 are shown. The mower combination 2 comprises an agricultural vehicle 4 such as a tractor, and a number of mowing units 6, 8, 10 suitable for cutting standing crop, the mowing units 6, 8, 10 being connected to the agricultural vehicle 4. The mowing units 6, 8, 10 include a front mowing unit 6 located to the front of the agricultural vehicle 4 and two lateral mowing units 8, 10 located behind and to the sides of the front mowing unit 6, each of the mowing units 6, 8, 10 adapted to cut crop. The front mowing unit 6 is conveniently mounted on a front hitch 12 of the agricultural vehicle 4. The two lateral mowing units 8, 10 are conveniently mounted on a central chassis supported from a rear hitch 14 of the agricultural vehicle 4.

The lateral mowing units 8, 10 are supported from a central chassis by hydraulic units 22, 24. Each hydraulic unit 22, 24 may be used to move a respective lateral mowing unit 8, 10 from a working position to a transport position. A headland position may be defined between the working position and the transport position. In the working position, the height of each of the lateral mowing units 8, 10 above the ground surface may be further controlled by operation of the hydraulic units 22, 24.

In FIG. 1, a swath 20 produced by the front mowing unit 6 is shown. In practice, conveyors 16, 18 mounted to the rear of the lateral mowing units 8, 10 direct cut crop material to one side or the other of the respective lateral mowing units 8, 10 to produce a broader central swath 20 or one or more additional swathes as desired. These additional swathes are omitted from FIG. 1 for clarity.

The conveyors 16, 18 may be driven in any suitable manner, for example by way of a hydraulic circuit served by an accumulator on the agricultural vehicle 4 or by their own pumps and reservoirs mounted on the mowing units 8, 10.

The conveyors 16, 18 are mounted to be displaceable with respect to the lateral mowing units 8, 10. The conveyors 16, 18 are mounted to be displaced (as indicated by arrows A in FIGS. 1 and 2) in a direction perpendicular to the direction of travel (indicated by arrow T in FIG. 1) of the mower combination 2. The conveyors 8, 10 can comprise conveyor belts or conveyor screws.

The angle of slope of the ground surface S over which the mower combination 2 is travelling and the angle of inclination of the mower combination 2 itself when travelling over the ground surface S can be considered to correspond and will be referred to as the slope angle $\alpha$.

An operator can control operation of the front and rear mowing units 6, 8, 10 from within the agricultural vehicle 4 by use of a suitable user terminal 30. For example, the operator can control operation of the direction of the conveyors 16, 18, can cause each of the mowing units 6, 8, 10 to move from a working position to a headland position, can cause the rear mowing units 8, 10 to move from the working position to a transport position, or can cause the conveyors 16, 18 to move from an active position to an inactive position.

The user terminal 30 communicates with an electronic control unit 32. The control unit 32 provides signals to control operation of the front and rear hitches 12,14 of the agricultural vehicle 4 and provides signals to control operation of the mowing units 6, 8, 10 and the conveyors 16, 18. The signals are provided by way of a suitable data communication network such as one compliant with the ISOBUS standard (a network in conformance to ISO 11783).

The control unit 32 may comprise a single processor located on the agricultural vehicle or its functions may be split between a processor located on the agricultural vehicle and one or more additional processors located on the mowing units 6, 8, 10, the additional processor(s) being in electronic communication with the first processor.

The control unit 32 is also able to access a suitable memory 34. The memory 34 may take any suitable form and is in electronic communication with the control unit 32. The memory 34 is adapted to store, in any suitable manner such as a database or look-up table, reference values for a desired lateral displacement of the conveyors 16, 18 and a slope angle $\alpha$.

The mower combination 2 further comprises a plurality of sensors adapted to provide input signals to the control unit 32. An input signal representing the slope angle $\alpha$ can be provided by a suitable sensor 36. Examples of such sensors include a sensor incorporated within an electronic control system of the agricultural vehicle 4 or an inclinometer provided on the mower combination 2. Alternatively, the input signal may be provided by a GPS receiver 40; for example, the slope angle $\alpha$ between two points at the location of the mower combination 2 may be known or calculated from existing mapped data.

A network interface 42 may connect the GPS receiver 40 to the control unit 32. The network interface 42 can comprise hardware and/or software that enables wireless connection to one or more remotely located computing devices over a network (e.g., a wireless or mixed wireless and wired network). For instance, the network interface 42 may cooperate with browser software or other software of the control unit 30 to communicate with a server device, enabling remote monitoring or control of the mower combination 2.

Suitable sensors 38 mounted on the mower combination 2, for example on the conveyors 16, 18, can provide input signals representative of the lateral displacement of the conveyors 16, 18. The lateral displacement may be measured from any suitable reference point.

The control unit 32 is configured to receive the input signals representing the slope angle $\alpha$ and the lateral displacement of the conveyors 16, 18 and to compare the input signals with the reference values for a reference lateral displacement of the conveyors 16, 18 at a given slope angle $\alpha$ and, as required, adjust the lateral displacement of the conveyors 16, 18 based on this comparison.

Figure 4:
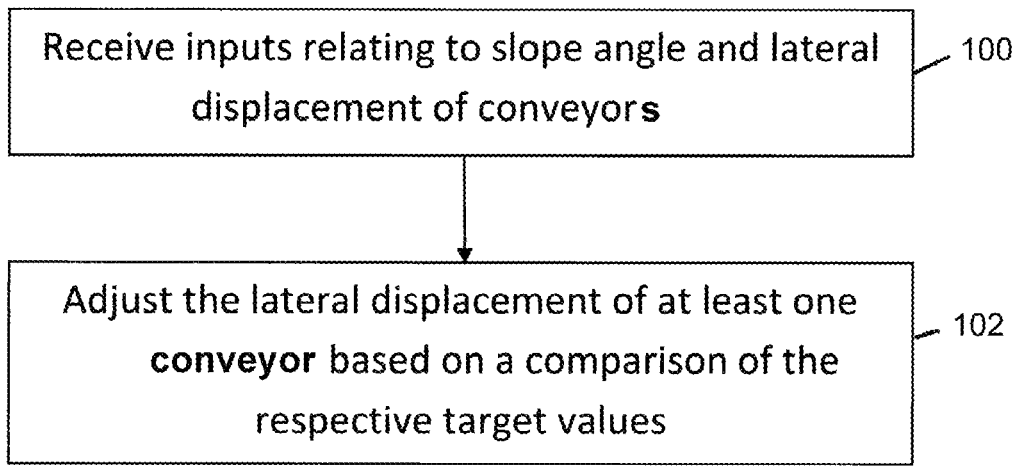
FIG. 4 shows a flow diagram illustrating an example control method.

For example, as the mower combination 2 traverses a slope, the control unit 32 detects the slope angle $\alpha$ and the lateral displacement of the conveyors 16, 18 (act 100 in FIG. 4) and based on a comparison of the input signals with the reference values stored in the memory 34, the control unit 32 causes the lateral displacement of the conveyor(s) 16, 18 to be adjusted (act 102). For example, depending upon a direction of travel over the slope angle $\alpha$, the left hand conveyor 16 may be moved to the left (away from the agricultural vehicle 4) and the right hand conveyor 18 simultaneously moved to the left (toward the agricultural vehicle 4). Alternatively, for the reverse slope, the left hand conveyor 16 may be moved to the right and the right hand conveyor 18 also moved to the right. In this way, despite the change in slope angle $\alpha$, a constant swath width is produced. This is beneficial for the further processing of the cut crop by a subsequent vehicle.

Additionally, the control unit 32 may be configured to receive input signals representing the slope angle $\alpha$, the lateral displacement of the conveyors 16, 18 and the speed of operation of the conveyors 16, 18. In this case, the memory 34 is adapted to store, in any suitable manner such as a database or look-up table, target values of combinations of the lateral displacement of the conveyors 16, 18 and the speed of operation of the conveyors 16, 18 at a given slope angle $\alpha$.

Figure 5:
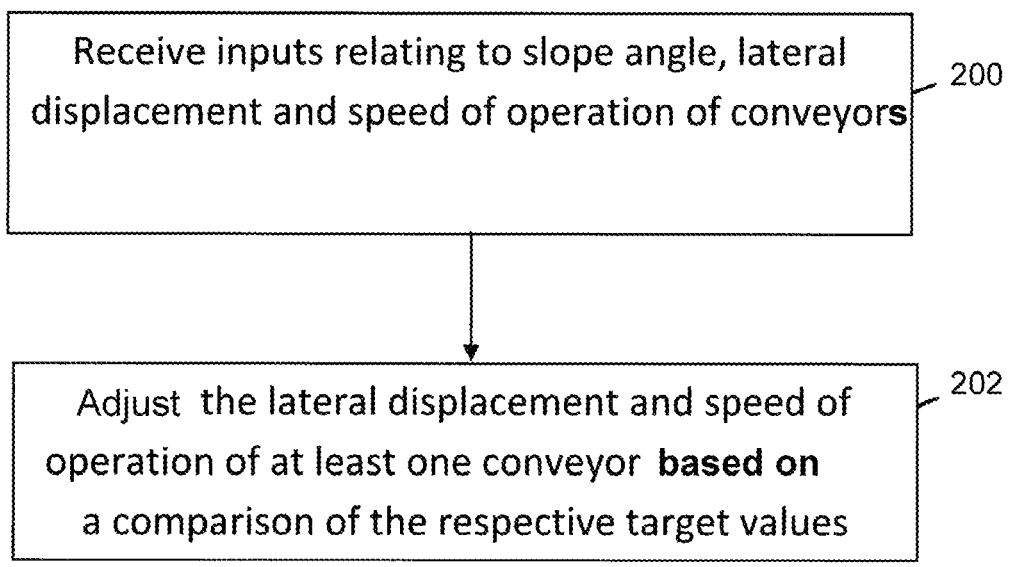
FIG. 5 shows a flow diagram illustrating a further example control method.

The control unit 34 receives the input signals representing the slope angle $\alpha$, the lateral displacement of the conveyors 16, 18, and the speed of operation of the conveyors 16, 18 (act 200 in FIG. 5), and based on a comparison of the input signals with the reference or target values stored in the memory 34, the control unit 32 causes a change in lateral displacement of the conveyor 16, 18 and also causes a change in speed of operation of the conveyors 16, 18 (act 202).

In other embodiments, the control unit 32 may receive input from the user terminal 30, as entered by the operator. For instance, the operator may prompt a display of the parameters (the slope angle $\alpha$, the speed of the mower combination 2, the speed of operation of the conveyors 16, 18, the lateral displacement of the conveyors 16, 18), where the control unit 32 provides the corresponding information for rendering on a display screen in the agricultural vehicle 4 or remotely, or otherwise provided to an operator in other forms (e.g., audibly). In some embodiments, the control unit 32 may provide feedback of any automatic adjustment in the lateral position of the conveyors 16, 18 and, if appropriate, any automatic adjustment to the speed of the conveyors 16, 18 to the operator via the user terminal 30.

Still other embodiments involve a computer-readable storage medium (e.g., a non-transitory computer-readable storage medium) having processor-executable instructions configured to implement one or more of the techniques presented herein. Many such computer-readable media may be devised by those of ordinary skill in the art that are configured to operate in accordance with one or more of the techniques presented herein.

From reading the present disclosure, other modifications will be apparent to persons skilled in the art. Such modifications may involve other features which are already known in the field of mowers and component parts therefore and which may be used instead of or in addition to features already described herein.

The invention claimed is:

1. A mower combination comprising:
   an agricultural vehicle coupled to a plurality of mowing units suitable for cutting standing crops, the plurality of mowing units comprising a front mowing unit and two lateral mowing units located behind and to the sides of the front mowing unit, each of the lateral mowing units comprising conveyor units configured to deposit cut crop as a swath, each of the conveyor units being laterally displaceable with respect to an associated lateral mowing unit;
   a sensor configured to:
      provide input signals representative of an angle of inclination ($\alpha$) of the mower combination; and
      provide input signals representative of a lateral displacement of each conveyor unit with respect to an associated lateral mowing unit; and
   a control unit configured to:
      receive the input signals representative of the angle of inclination ($\alpha$) of the mower combination and the input signals representative of the lateral displacements of each of the conveyors with respect to the associated lateral moving units;
      compare the received input signals representative of the angle of inclination ($\alpha$) of the mower combination and the input signals representative of the lateral displacements each of the conveyors with respect to the associated lateral moving units to a predetermined set of values; and
      based at least partially on the comparison, cause the lateral displacement of at least one conveyor unit with respect to the associated lateral mowing unit to be adjusted.

2. The mower combination of claim 1, wherein the conveyors comprise at least one selected from the group consisting of conveyor belts and conveyor screws.

3. The mower combination of claim 1, further comprising a user terminal coupled to the control unit and configured to provide feedback about the adjustment of the lateral displacement of the conveyors.

4. A method of operating a mower combination comprising an agricultural vehicle coupled to a plurality of mower units, the method comprising:
   receiving in real time input signals representing an angle of inclination of the mower combination, and a lateral displacement of at least one conveyor of the mower combination with respect to the associated lateral mowing unit; and
   adjusting the lateral displacement of the at least one conveyor based on a comparison of the input signals with respective target values.

5. A mower combination, comprising:
   an agricultural vehicle;
   a plurality of mowing units coupled to the agricultural vehicle and comprising:
      a front mowing unit; and
      two lateral mowing units located behind and to the sides of the front mowing unit, each of the two lateral mowing units comprising conveyor units configured to deposit cut crop as a swath,
      wherein each of the conveyor units is laterally displaceable with respect to a respective lateral mowing unit of the two lateral mowing units;
   at least one sensor configured to:
      determine an angle of inclination ($\alpha$) of the mower combination; and
      determine a lateral displacement of each conveyor unit with respect to a respective lateral mowing unit of the two lateral mowing units; and
   a control unit operably coupled to the at least one sensor and the plurality of mowing units, the control unit comprising:
      at least one processor; and
      at least one non-transitory computer-readable storage medium storing instructions thereon that, when executed by the at least one processor, cause the control unit to:
         receive first data representative of the angle of inclination ($\alpha$) of the mower combination and second data representative of lateral displacements of each of the conveyors with respect to the associated lateral moving units;
         compare the received first data and the second data to a predetermined set of values; and
         based at least partially on the comparison, cause the lateral displacement of at least one conveyor unit with respect to the associated lateral mowing unit to be adjusted.

* * * * *